(12) United States Patent
Bohle (10) Patent No.: US 11,885,429 B2
(45) Date of Patent: Jan. 30, 2024

(54) APPARATUS FOR OPERATING A FITTING IN A SUPPLY LINE, AND ARRANGEMENT

(71) Applicants: Axel Sacharowitz, Berlin (DE); Fabian Sacharowitz, Berlin (DE); Steffan Sacharowitz, Berlin (DE)

(72) Inventor: Daniel Bohle, Berlin (DE)

( * ) Notice: Subject to any disclaimer, the term of this patent is extended or adjusted under 35 U.S.C. 154(b) by 0 days.

(21) Appl. No.: 17/837,156

(22) Filed: Jun. 10, 2022

(65) Prior Publication Data
US 2022/0397208 A1 Dec. 15, 2022

(30) Foreign Application Priority Data
Jun. 11, 2021 (EP) .................................. 211790449

(51) Int. Cl.
*F16K 31/04* (2006.01)

(52) U.S. Cl.
CPC .................. *F16K 31/047* (2013.01)

(58) Field of Classification Search
CPC ...... F16K 31/047; F16K 31/055; F16K 31/05; H02K 7/003; H02K 7/116; H02K 7/14
See application file for complete search history.

(56) References Cited

U.S. PATENT DOCUMENTS

| | | | | |
|---|---|---|---|---|
| 2,302,848 A | * | 11/1942 | Fitz | F16K 31/05 318/475 |
| 2,992,807 A | * | 7/1961 | Karlby | F16K 31/047 251/76 |
| 3,371,545 A | * | 3/1968 | Mcneal, Jr. | F16K 31/05 74/89.36 |
| 2005/0247900 A1 | * | 11/2005 | Marsh | F16K 31/047 251/77 |
| 2007/0119505 A1 | * | 5/2007 | Petrenko | F16K 31/042 137/554 |
| 2019/0331203 A1 | | 10/2019 | Mei et al. | |
| 2021/0332906 A1 | * | 10/2021 | Fachechi | H02K 1/278 |

FOREIGN PATENT DOCUMENTS

| | | |
|---|---|---|
| CN | 2906255 Y | 5/2007 |
| CN | 107387842 A | 11/2017 |
| EP | 1002943 A2 | 5/2000 |
| EP | 2716948 A1 | 4/2014 |
| WO | WO-2021069037 A1 | 4/2021 |

OTHER PUBLICATIONS

Text translation of applicant's cited CN2906255 (Year: 2023).*

* cited by examiner

*Primary Examiner* — Patrick C Williams
(74) *Attorney, Agent, or Firm* — Harness, Dickey & Pierce, P.L.C.

(57) ABSTRACT

The disclosure relates to an apparatus for operating a fitting in a supply line. The apparatus is formed with a coupling device which is configured to be connected to a rotatable actuator of a fitting in a supply line in order to transmit a rotary drive movement to the rotatable actuator for operating the fitting; a drive motor which is configured to provide the rotary drive movement; a transmission device which is connected on the drive side to the drive motor and on the output side to the coupling device in order to transmit the rotary drive movement; and an internal receptacle having an internal motor opening extending through the drive motor and an internal transmission opening extending through the transmission device, which transmission opening at least partially overlaps the internal motor opening in a direction of passage of the internal receptacle to form the internal receptacle.

13 Claims, 7 Drawing Sheets

Fig. 2

APPARATUS FOR OPERATING A FITTING IN A SUPPLY LINE, AND ARRANGEMENT

CROSS-REFERENCE TO RELATED APPLICATIONS

This application claims the benefit and priority of European Patent Application No. 21179044.9, filed Jun. 11, 2021. The entire disclosure of the above application is incorporated herein by reference.

FIELD

The invention relates to an apparatus for operating a fitting in a supply line and to an arrangement.

BACKGROUND

Supply lines are used to transport different media, such as gas, oil, water, and waste water, and can be designed as subsurface or above-ground lines. Such supply lines also include, for example, district heating lines. Fittings in a supply line make it possible, in particular, to open and close passageways in the pipelines of the supply line. The fitting can be installed above ground in a supply line. In another configuration, the fitting can be arranged in a subsurface supply line in the subsurface installation, i.e. below the ground surface. Alternatively, it can be provided to install the fitting in a shaft structure or to arrange a (possibly rather short) portion of the pipeline of the subsurface supply line above ground, for example in a pumping station.

Devices for operating a fitting of a supply line are known on the one hand as mobile operating apparatuses, i.e. as an apparatus that can be taken from fitting to fitting in order to operate the corresponding fitting. In a simple manual embodiment, this is a so-called T-wrench, for example, which, in order to operate the fitting, is connected to a rotatable actuator of the fitting in order to then turn the T-wrench by hand. Motor-driven mobile operating apparatuses are also known. Alternatively, a stationary operating apparatus can be provided, which remains at the location of the fitting, but can be arranged on the fitting in an exchangeable or removable manner, for example for the purpose of assembly and disassembly. The stationary operating apparatus can also be operated manually or with a motor.

SUMMARY

The object of the invention is to specify an apparatus for operating a fitting in a supply line and an arrangement, both of which provide an operating apparatus for the fitting that is as space-saving as possible and can be used flexibly in different application situations.

To achieve this, an apparatus for operating a fitting in a supply line according to independent claim 1 and an arrangement according to independent claim 10 are provided. Embodiments are the subject matter of dependent claims.

According to one aspect, an apparatus for operating a fitting in a supply line is provided, which comprises the following: a coupling device which is configured to be connected to a rotatable actuator of a fitting in a supply line in order to transmit a rotary drive movement to the rotatable actuator for operating the fitting; a drive motor which is configured to provide the rotary drive movement; a transmission device which is connected on the drive side to the drive motor and on the output side to the coupling device in order to transmit the rotary drive movement; and an internal receptacle having an internal motor opening extending through the drive motor and an internal transmission opening extending through the transmission device, which transmission opening at least partially overlaps the internal motor opening in a direction of passage of the internal receptacle to form the internal receptacle.

According to a further aspect, an arrangement is created having both a fitting arranged in a supply line and the apparatus for operating the fitting, which apparatus is connected to the fitting.

The design of the internal receptacle having the internal motor opening and the internal transmission opening allows a space-saving design of the apparatus for operating the fitting. The internal receptacle provides an installation space or a usable space in which different elements or components can be received, for example for manually operating the fitting. However, in an exemplary embodiment, a rising spindle of the fitting can also protrude into the internal receptacle. Parts or components of both the drive motor and the transmission device are arranged at least partially around the corresponding internal opening and thus around the receptacle. In comparison to known motor-driven operating apparatuses, this results in a more compact design.

In one embodiment, the receptacle provides a type of insertion channel or plug-in channel for a manual operating device, so that the manual operating device can be inserted into the internal receptacle with at least one coupling portion, up to the point of coupling to the rotatable actuator of the fitting, the rotary actuation of which serves to operate the fitting in the supply line.

The internal transmission opening and the internal motor opening may substantially completely overlap to form the internal receptacle, wherein the openings may have a substantially equal opening area in one example.

The drive motor can comprise an external rotor motor, and the internal motor opening can be formed through the external rotor motor. In external rotor motors, the stator is usually arranged on the inside, while the rotor is on the outside and rotates during operation. The stator and the rotor are formed around the internal motor opening and thereby provide, as part of the receptacle, the passageway for inserting the manual operating device.

The internal motor opening can be formed in a hollow motor shaft of the drive motor. Such a hollow motor shaft can be provided both in an embodiment with the external rotor motor and alternatively in a motor with an internal rotor.

In an alternative embodiment, the drive motor can be designed as an internal rotor motor. For example, an internal rotor can be advantageous if higher speeds are to be provided for operating the fitting.

The transmission device can comprise a shaft transmission, and the internal transmission opening can be formed through the shaft transmission. The shaft transmission is continuously formed around the internal transmission opening, wherein the receptacle can extend along a central axis of the shaft transmission.

The coupling device can comprise a connecting element which can be functionally connected to a manual operating device such that the manual operating device, after being connected to the connecting element, extends in the direction of passage in the internal receptacle having the internal motor opening and the internal transmission opening, whether in portions or through the internal receptacle. The coupling device can comprise a square end, for example, onto which the manual operating device can be plugged.

The coupling device can comprise a passage which at least partially, optionally completely, overlaps with the internal receptacle in the direction of passage.

The coupling device having the passage can be configured to receive a rising spindle of the fitting such that the rising spindle can be displaced at least in portions through the passage into the internal receptacle and optionally out of the internal receptacle when the fitting is operated.

A control device can be provided which is connected to the drive motor and configured to actuate the drive motor for operating the fitting in accordance with control signals, the control device being formed around an internal control device opening extending through the control device and forming part of the internal receptacle. The control device can additionally be configured to receive and send data via a data communication interface, for example signal data that indicate a rotary position when the fitting is operated. The data communication interface can be configured for wireless data communication. Parts or components of the control device may be arranged around the internal control device opening which is part of the receptacle. It can be provided that parts or components of the control device are arranged on a printed circuit board comprising an internal printed circuit board opening through which the internal receptacle extends, so that the internal printed circuit board opening is part of the control device opening.

The internal receptacle can have a receptacle diameter of at least approximately 8 mm, and the internal motor opening and the internal transmission opening can each have an opening diameter which is at least equal to the receptacle diameter. Alternatively, the receptacle diameter can be at least approximately 10 mm and in a further alternative embodiment at least approximately 15 mm. In addition to the internal motor opening and the internal transmission opening, the internal control device opening also has an opening diameter which is at least equal to the receptacle diameter when the control device is formed with the internal control device opening.

In alternative embodiments, a component portion of a manual operating device can substantially completely cover or fill the receptacle diameter of the receptacle in the inserted state, such that the manual operating device can still rotate freely, or there can be a radially circumferential distance between the surface of the component portion and the inside of the receptacle, whereby free rotation is also provided. Similarly, this can be provided for, for example, a rising spindle extending into the internal receptacle.

The apparatus can be designed as a stationary operating apparatus which is configured to be arranged in a stationary and optionally exchangeable manner on the fitting for operating. The stationary operating apparatus is arranged in a fixed manner on the fitting or an assigned operating point, but can optionally be exchanged, for example for replacement or for maintenance. In contrast to this, known mobile operating apparatuses are not arranged in a fixed or stationary manner on a fitting, but are moved from fitting to fitting for the purpose of an operating process.

The following embodiments can also be provided in connection with the arrangement having both the fitting and the apparatus connected thereto.

As an alternative to an above-ground supply line, the fitting can be arranged in a subsurface supply line. In this embodiment, the fitting of the arrangement can be arranged or built into a subsurface installation. In this case, the fitting is arranged below the ground surface in which the associated supply line is laid.

The apparatus for operating the fitting can be arranged in a subsurface installation. Not only the fitting, but also the apparatus for operating the fitting is arranged below the ground surface in this embodiment. Alternatively, it can be provided to arrange the apparatus for operating the fitting above the ground surface and to connect it to the fitting in the subsurface installation. However, in the case of a subsurface supply line, both the apparatus for operating and the fitting can alternatively be arranged above the ground surface if the fitting is arranged in a pipeline portion of the supply line above the ground surface.

The apparatus for operating the fitting can be connected to a receiving component which is received in the surrounding ground in a rotationally fixed manner. By coupling to the receiving component, which in turn is received or fixed in the surrounding ground in a rotationally fixed manner, a holding force counteracting rotation is provided when the fitting is operated by means of the drive motor.

The receiving component can be formed as part of a surface box device, for example designed as a surface box, with which access to an operating point of the fitting in the subsurface installation is provided or secured. The apparatus for operating the fitting can be connected to a support plate, for example mounted in a passage in the support plate, optionally detachably. The support plate can in turn be designed as a support for the surface box.

The apparatus for operating the fitting can be arranged as a stationary operating apparatus for operating the fitting in a stationary and optionally exchangeable manner.

The embodiments provided in connection with the apparatus for operating the fitting can be configured accordingly in the arrangement.

DESCRIPTION OF THE EMBODIMENTS

Further embodiments are explained in greater detail below with reference to the drawings, in which.

Figure 1:
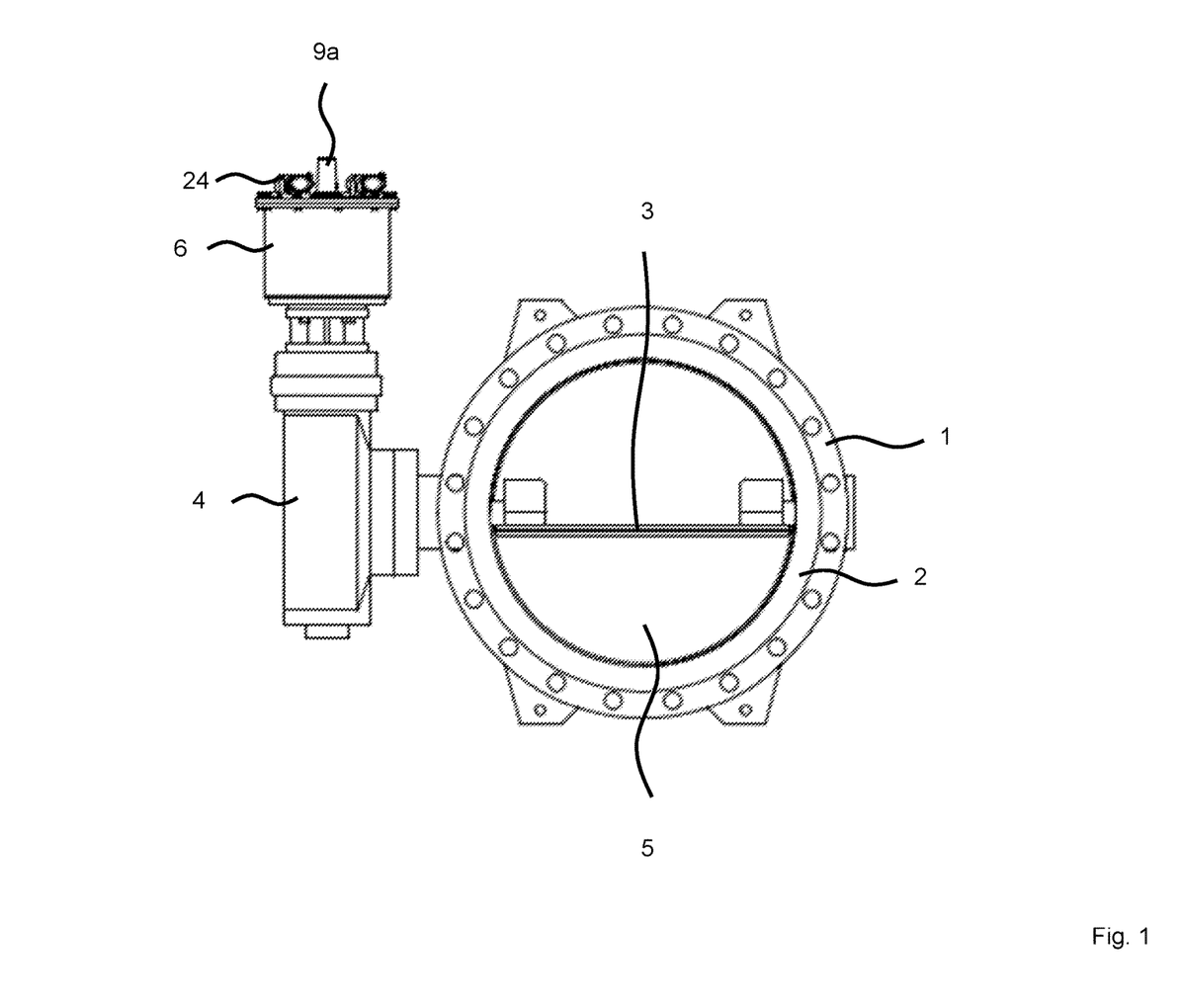
FIG. 1 is a schematic representation of an arrangement having both a fitting in a supply line and an apparatus for operating the fitting.

FIG. 1 is a schematic representation of an arrangement having a supply line 1, for example a pipeline for transporting gas, oil, water, or district heating. The supply line 1 may be a subsurface supply line or an above-ground (surface) supply line. In a pipe 2 of the supply line 1, a final control element 3 of a fitting 4 is arranged, for example in one embodiment as a pivoting fitting having a transmission. By rotating a rotatable actuator of the fitting 4, the final control element 3 of the fitting 4 is placed (rotated) in the pipe 2 so as to allow varying degrees of flow through an opening 5 in the pipe 2.

In order to achieve this, an apparatus 6 for operating is arranged in a stationary manner on the fitting 4, with which apparatus a rotary drive movement is provided in order to transmit said movement to the rotatable actuator and thus adjust the final control element 3. The arrangement having both the fitting 4 and the apparatus 6 for operating can be provided in the exemplary case of a subsurface supply line in the subsurface installation. Alternatively, at least the apparatus 6 for operating the fitting 4 can be arranged above the ground surface, even in the case of a subsurface supply line, for example in a shaft structure. The apparatus 6 for operating the fitting 4 comprises an external housing 6a.

Figure 2:
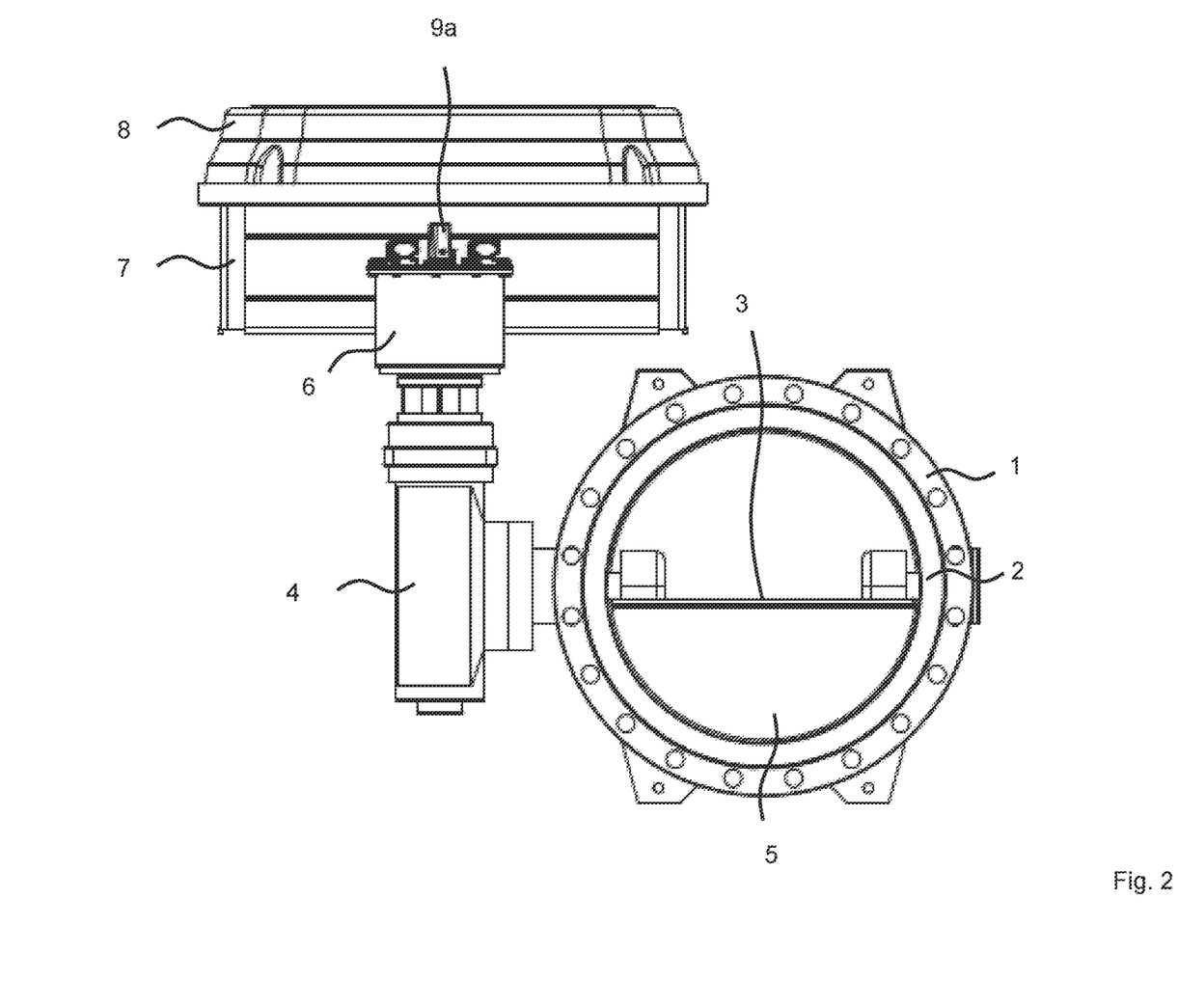
FIG. 2 is a schematic representation of a further arrangement having both a fitting in a subsurface supply line and an apparatus for operating the fitting, in which apparatus an operating point is arranged within a surface box.

FIG. 2 shows an arrangement having both a subsurface supply line 1 and the associated fitting 4. The apparatus 6 for operating the fitting 4 is arranged within a surface box 7 in the ground. As an alternative to the embodiment in FIG. 2, the apparatus 6 for operating can be connected in a rotationally fixed manner to the surface box 7 which in turn is received in the ground in a rotationally fixed manner and can thus absorb a counter-torque occurring when the fitting 4 is operated. In the embodiment in FIG. 2, the apparatus 6 for operating is flanged onto the fitting. The counter-torque is absorbed by the fitting 4.

In order to allow access to the apparatus 6 for operating and thus the operating point of the fitting 4, a cover 8 which is arranged on the surface box 7 can be opened, as is known per se. The drive movement provided by means of the apparatus 6 for operating is transmitted to the fitting 4 via a coupling 9.

Figure 3:
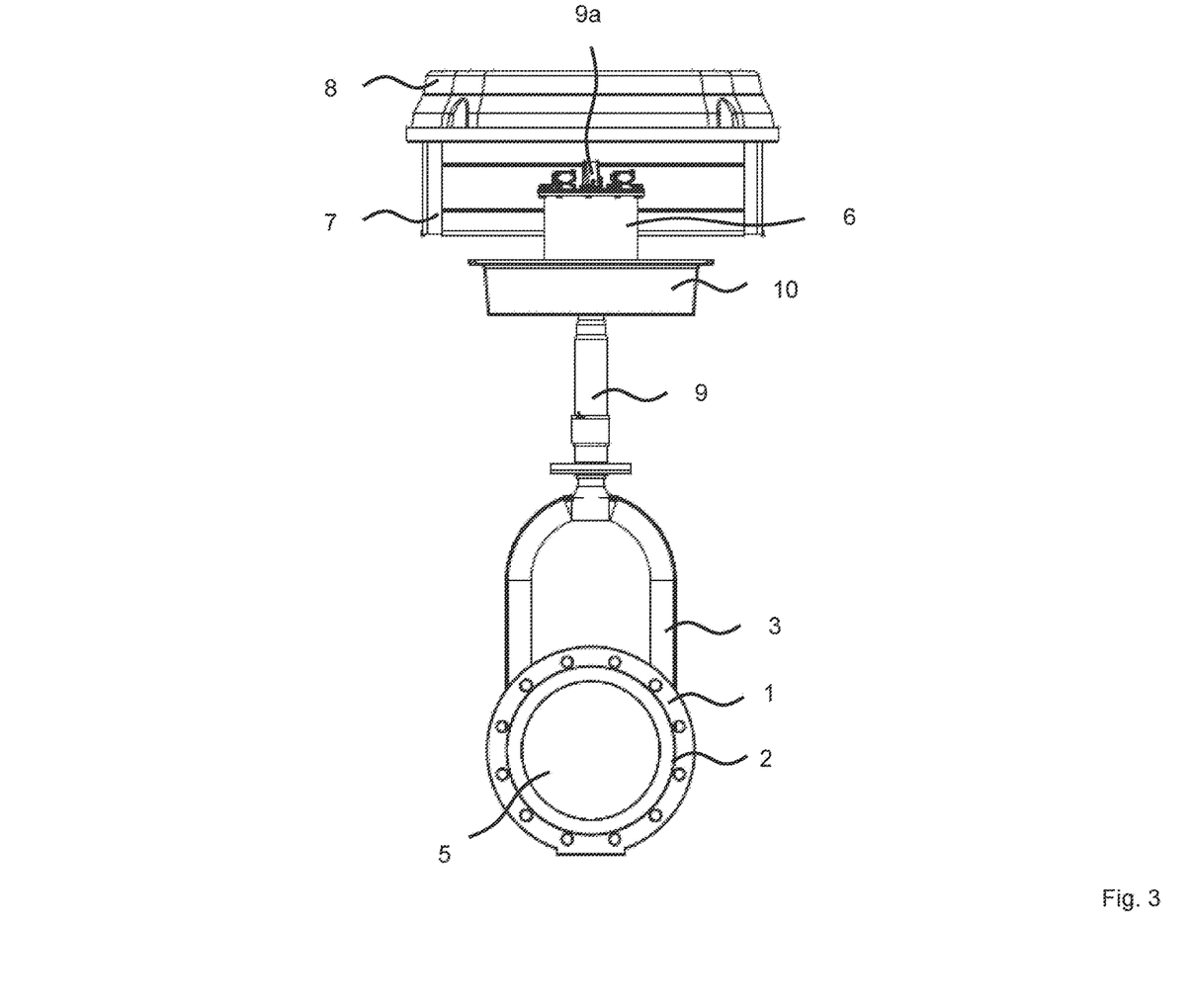
FIG. 3 is a schematic representation of another arrangement having both a fitting with an alternative fitting type in a subsurface supply line and an apparatus for operating the fitting in which an operating point is arranged within a surface box.

FIG. 3 is a schematic representation of another arrangement having both the fitting 4 with a final control element 3 designed as a horizontally displaceable slide in a subsurface supply line 1 and the apparatus 6 for operating the fitting 4 in which an operating point is arranged inside a surface box 7. The apparatus 6 for operating the fitting 4 is received on a support plate 7a which is arranged below the surface box 7 and the cover 8 and is received in the ground in a rotationally fixed manner. As a result, forces that occur when the fitting 4 is actuated by means of the apparatus 6 for operating can be absorbed by the support plate 7a.

In the embodiment shown, a protruding coupling component 9a which comprises a square, for example, for coupling to a manual rotary wrench (not shown) is provided as part of a manual operation in the apparatus 6 for operating.

FIGS. 4 to 7 show various embodiments of components of the apparatus 6 for operating the fitting 4 in a front view and in section A-A, with the housing 6a being omitted.

A drive motor 10 is provided as the drive device, which drive motor in the embodiments shown is formed as an external rotor motor having an external rotor 11 and an internal stator 12. The drive motor 10 comprises an internal motor opening 13 which is formed in a hollow motor shaft 14.

Figure 4:
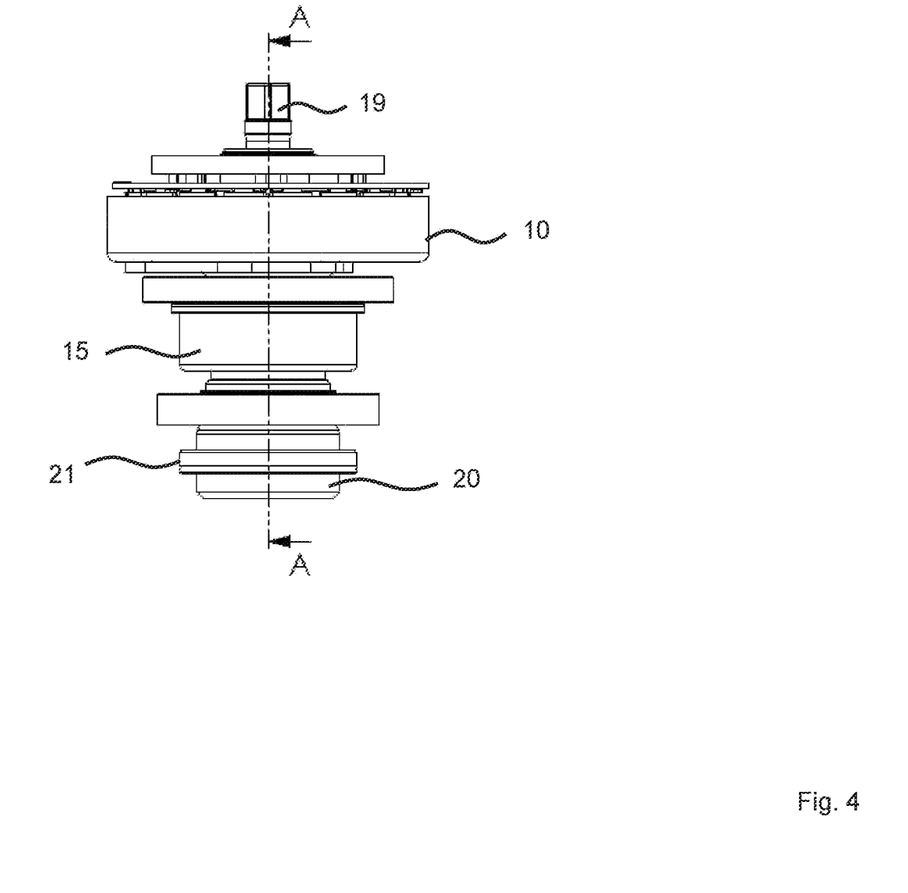
FIG. 4 is a schematic representation of an apparatus for operating a fitting in a supply line.
Figure 5:
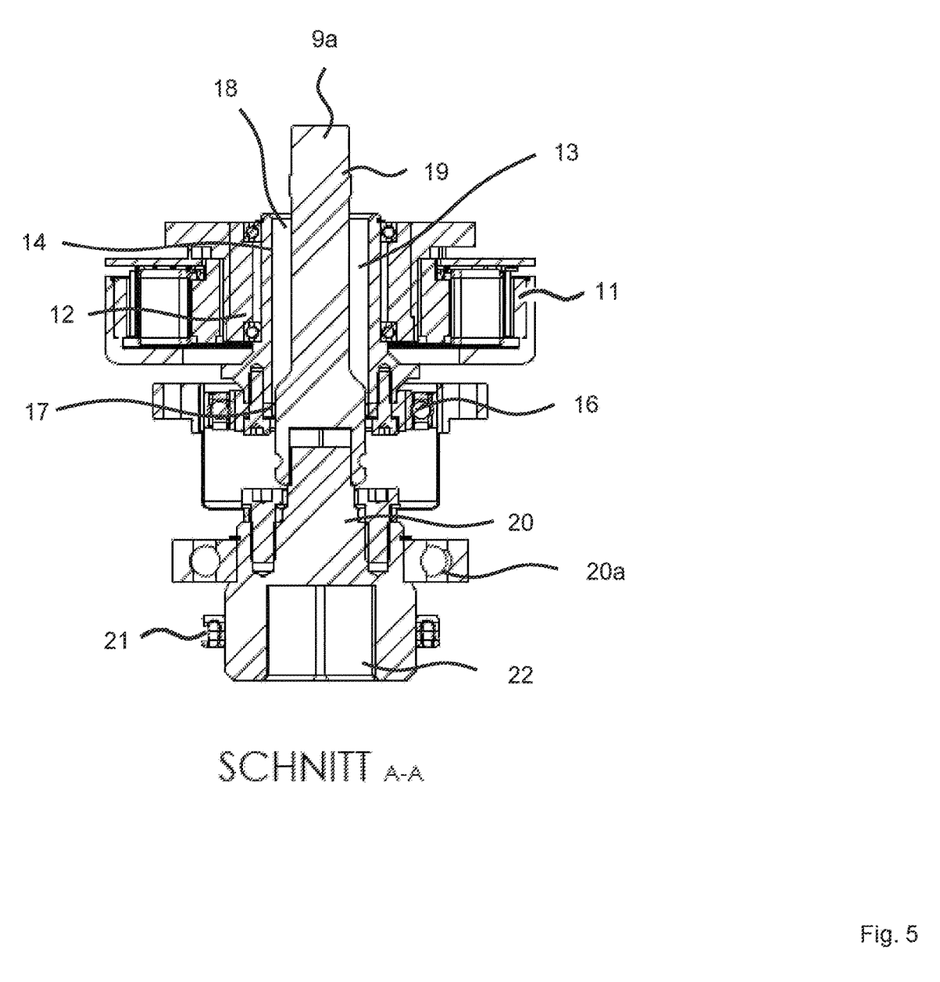
FIG. 5 is a sectional view of the apparatus from FIG. 4.

A transmission device 15 is arranged below the drive motor 10 and is formed with a shaft transmission 16 in the embodiment shown. The transmission device 15 comprises an internal transmission opening 17 which, together with the internal motor opening 13, is part of an (internal) receptacle 18 into which, for example, a component 19 of a manual operating device can be inserted. The detachably or non-detachably arranged component 19, optionally in connection with an operating device (e.g. a T-wrench), serves to transmit a manually generated force to the turning of the actuator of the fitting 4, can operate the fitting 4 by hand rotation, i.e. via a coupling component 20 which is rotatably mounted by means of a pivot bearing 20a and to which a circumferential seal 21 is assigned. The rotational movement provided by the drive motor 10 is transmitted in the same way via the coupling component 20. In particular in the case of a non-detachable assembly, the component 19 can be designed as part of a manual operation in order to provide, for example, the coupling component 9a (see also FIG. 1) which can be connected to a rotary wrench (e.g. a T-wrench), for example, for manual operation.

In the example shown, the apparatus 6 for operating the fitting 4 thus makes both available, namely a mechanical or motor-driven drive for operating and the option for manual operation. Both the drive motor 10 and the transmission device 15 are designed to save space around the internal receptacle 18. The coupling component 20 can be connected to the rotating actuator (not shown) of the fitting 4 via a coupling point 22 (e.g. a receptacle) on said coupling component in order to effect manual or mechanical operation thereof.

Figure 6:
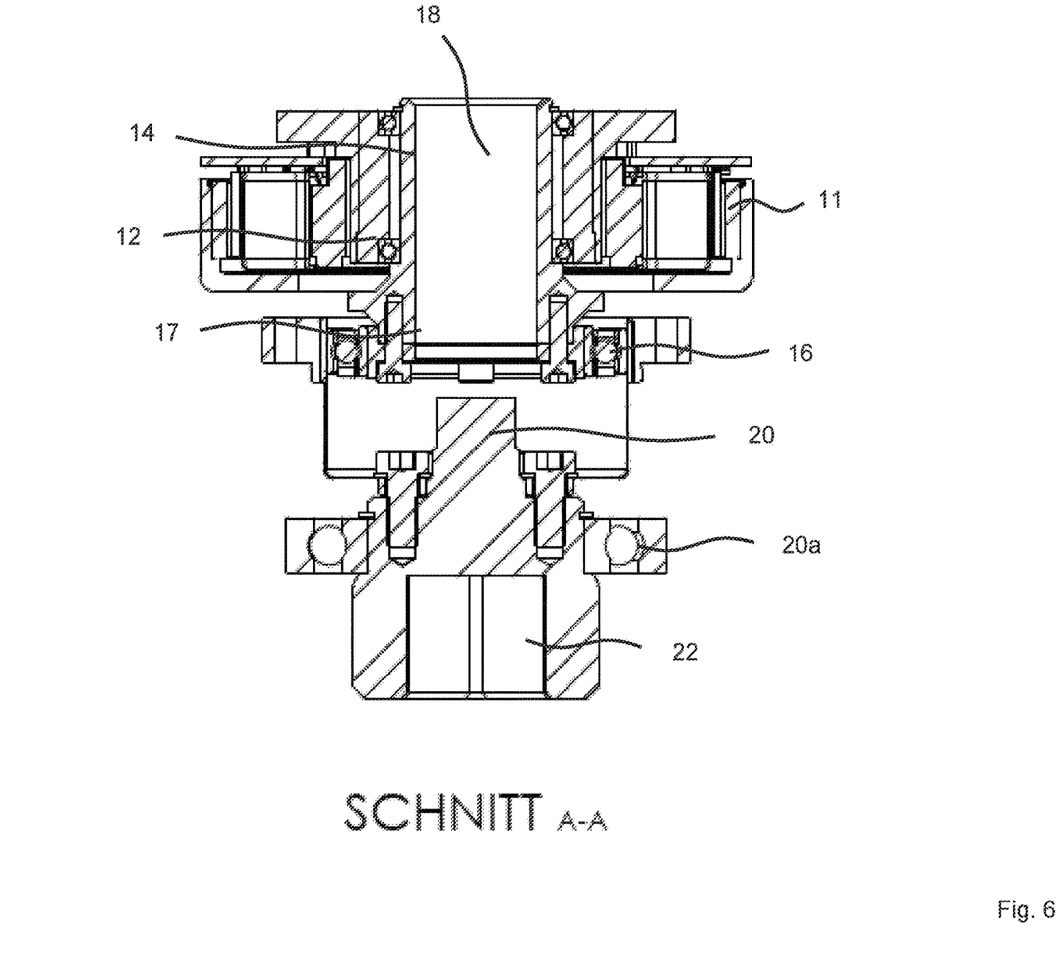
FIG. 6 is a sectional view of a further apparatus for operating a fitting in a supply line.

FIG. 6 is a further representation of the embodiment from FIG. 5, with the component 19 being detached from the coupling component 20 and removed from the internal receptacle 18. For example, a manual operating device (such as a rotary wrench) can then be inserted into the internal receptacle 18 and connected directly to the coupling component 20.

Figure 7:
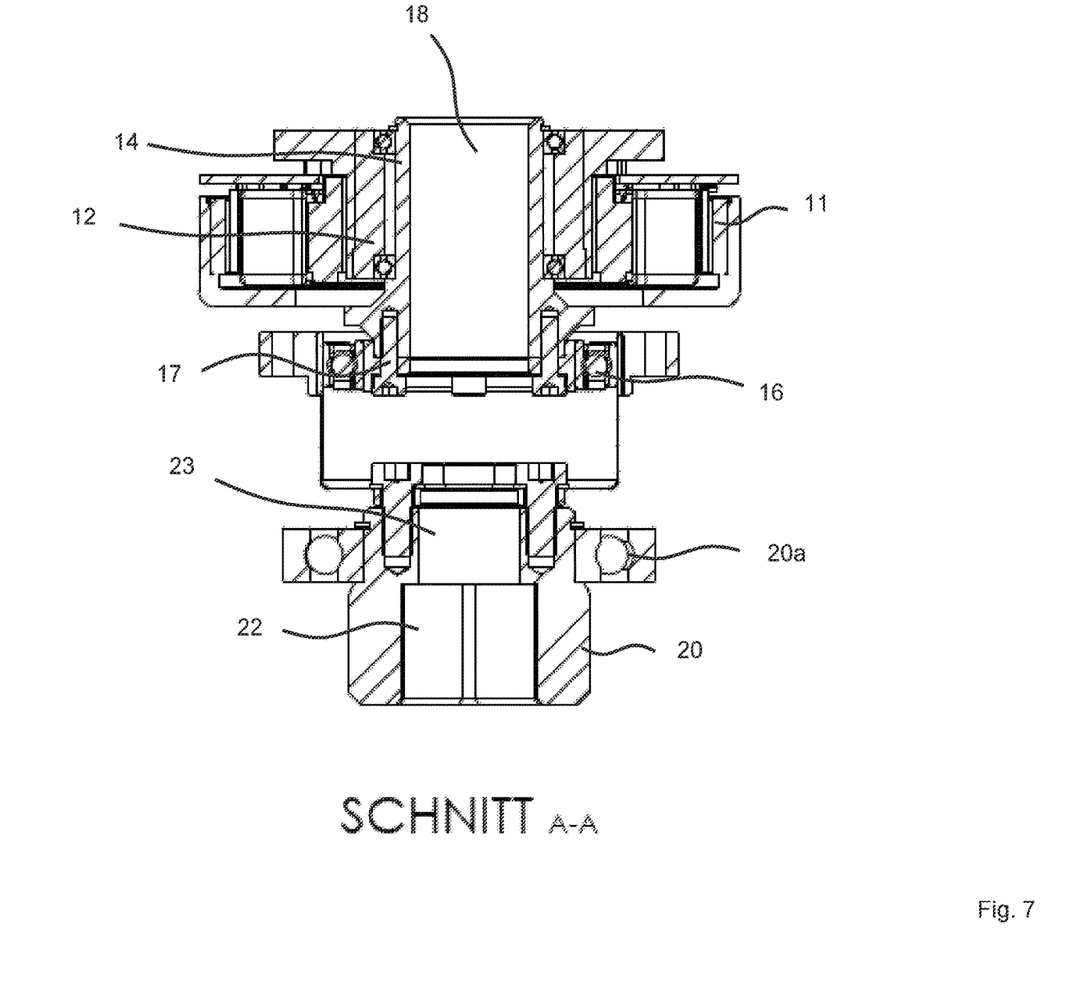
FIG. 7 is a sectional view of another apparatus for operating a fitting in a supply line.

In the exemplary embodiment in FIG. 7, the coupling component 20 is formed with a passageway 23 in the vertical direction, which passageway overlaps, in particular is centered, with the internal receptacle 18 in the vertical direction of passage. As a result, for example, a rising spindle (not shown) of the fitting 4 can pass through the passageway 23 into the internal receptacle 18 during operation when the fitting 4 is operated. In this case, the rotational movement for operating the fitting 4 is transmitted as the spindle rises again via the coupling component 20, for example to a spindle nut assigned to the rising spindle, which spindle nut is connected to the coupling component 20 for this purpose in order to transmit the drive movement provided by the drive motor 10 via the transmission device 15.

In different embodiments, the apparatus 6 for operating the fitting 4 can be designed in supply lines with a minimum nominal diameter of DN40, alternatively for a fitting for a supply line with a minimum nominal diameter of DN60 or a minimum nominal diameter of DN80.

The features disclosed in the above description, the claims, and the drawings can be of relevance, both individually and also in any combination, for realizing the different embodiments.

The invention claimed is:

1. Apparatus for operating a fitting in a supply line, comprising:
   a coupling device which is configured to be connected to a rotatable actuator of a fitting in a supply line in order to transmit a rotary drive movement to the rotatable actuator for operating the fitting;
   a drive motor which is configured to provide the rotary drive movement and having an internal motor opening extending through the drive motor; and
   a transmission device which is connected on the drive side to the drive motor and on the output side to the coupling device in order to transmit the rotary drive movement, where the transmission device has an internal transmission opening extending through the transmission device and the internal transmission opening at least partially overlaps with the internal motor opening;
   wherein the coupling device comprises a connecting element which can be functionally connected to a manual operating device such that the manual operating device, after being connected to the connecting element, extends in the direction of the internal motor opening and the internal transmission opening.

2. Apparatus according to claim 1, characterized in that the internal motor opening is formed in a hollow motor shaft of the drive motor.

3. Apparatus according to claim 1, characterized in that the transmission device comprises a shaft transmission and the internal transmission opening is formed through the shaft transmission.

4. Apparatus according to claim 1, characterized in that the coupling device comprises a passage which at least partially overlaps with the internal transmission opening.

5. Apparatus according to claim 1, characterized in that a control device is provided, which is connected to the drive motor and configured to actuate the drive motor for operating the fitting in accordance with control signals, the control device comprising an internal control device opening formed therein.

6. Apparatus according to claim 1, characterized in that the internal motor opening and the internal transmission opening each have an opening diameter at least approximately 8 mm.

7. Apparatus according to claim 1, designed as a stationary operating apparatus which is configured to be arranged in a stationary manner on the fitting for operating.

8. An arrangement, comprising
a fitting which is arranged in a supply line; and
an apparatus for operating the fitting, which apparatus is connected to the fitting and is configured according to claim 1.

9. Arrangement according to claim 8, characterized in that the fitting is arranged in a subsurface supply line.

10. Arrangement according to claim 9, characterized in that the apparatus for operating the fitting is arranged in a subsurface installation.

11. Arrangement according to claim 9, characterized in that the apparatus for operating the fitting is connected to a receiving component which is received in the surrounding ground in a rotationally fixed manner.

12. Arrangement according to claim 8, characterized in that the fitting comprises a rising spindle which, when the fitting is operated, can be displaced at least in portions into the internal motor opening through a passage in the coupling device, which passage at least partially overlaps with internal motor opening.

13. Arrangement according to claim 8, characterized in that the apparatus for operating the fitting is arranged on the fitting in a stationary and exchangeable manner as a stationary operating apparatus for operating.

* * * * *